United States Patent
Katakai

[11] Patent Number: 6,098,841
[45] Date of Patent: Aug. 8, 2000

[54] COMMODITY TAKEOUT MECHANISM OF AUTOMATIC VENDING MACHINE

[75] Inventor: Kazutoshi Katakai, Gunma-machi, Japan

[73] Assignee: The Coca-Cola Company, Atlanta, Ga.

[21] Appl. No.: 09/068,848

[22] PCT Filed: Sep. 17, 1997

[86] PCT No.: PCT/JP97/03278

§ 371 Date: May 19, 1998

§ 102(e) Date: May 19, 1998

[30] Foreign Application Priority Data

Sep. 19, 1996 [JP] Japan ................................ 8-248054

[51] Int. Cl.[7] ................................................ B65G 59/00
[52] U.S. Cl. ........................................ 221/251; 221/289
[58] Field of Search ................................ 221/251, 289, 221/123, 131, 298, 112, 113, 116

[56] References Cited

U.S. PATENT DOCUMENTS 3,158,289  11/1964  Van Brunt .............................. 221/289

FOREIGN PATENT DOCUMENTS 57-140479  9/1982  Japan .

*Primary Examiner*—Kenneth W. Noland
*Attorney, Agent, or Firm*—Dennis W. Braswell; Michael V. Kruljac

[57] ABSTRACT

To securely take out only a commodity at an end of a commodity string stored in a commodity route, a commodity takeout unit of an automatic vending machine is provided with a pair of arms movable between the work position protruding into the commodity route and the retreat position retreating from the commodity route and a driving member for driving the arms with a time difference.

4 Claims, 3 Drawing Sheets

COMMODITY TAKEOUT MECHANISM OF AUTOMATIC VENDING MACHINE

TECHNICAL FIELD

The present invention relates to a commodity takeout unit of an automatic vending machine used to vend a commodity finished by cramming contents into a vessel such as a bottle, can, or PET bottle.

BACKGROUND ART

An example of this type of the commodity takeout unit of an automatic vending machine is disclosed in the official gazette of Japanese Utility Model Laid-Open No. Hei 1-147483. The commodity takeout unit successively takes out commodities from a commodity string on a tilted commodity rack, including a reciprocatively rotatable control member. Commodities are successively taken out from a commodity rack starting with one present at an end of a commodity string by reciprocatively rotating the control member and alternately protruding the both ends of the member onto a commodity rack.

Another example of this type of the commodity takeout unit of an automatic vending machine is disclosed in Japanese Patent Laid-Open No. Hei 5-197877. The commodity takeout unit includes two hinge-type stoppers rotatably connected each other. Commodities stored in a commodity route in line are successively taken out starting with one present at an end of a commodity string by alternately protruding the curved portions of two stoppers to the commodity route.

However, malfunction may occur that not only the commodity at the end of the commodity string but also an adjacent commodity are taken out by getting over the control member or stopper.

Therefore, it is an object of the present invention to provide an commodity takeout unit of an automatic vending machine capable of securely taking out only the commodity at an end of a commodity string.

DISCLOSURE OF THE INVENTION

According to an aspect of the present invention, it is possible to obtain a commodity takeout unit of an automatic vending machine provided with a pair of arm movable between the work position protruding to a commodity route and the retreat position retreating from the commodity route and a driving member for driving the arms with a time difference.

Because the commodity takeout unit of an automatic vending machine is provided with a driving member for driving a pair of arms with a time difference, it is possible to move one arm to a position nearby the work position while holding the other at the work position and then, move the other arm to the retreat position and the one arm to the work position. Resultingly, the commodity at an end of a commodity string stored in a commodity route and the commodity at the second position from the end of the commodity string are temporarily held by the arms at the same time and then, the commodity at the end of the commodity string loses the support by the other arm and it is taken out of the commodity route.

Moreover, after taking out the commodity at an end of a commodity string, the commodity takeout unit of an automatic vending machine can move one arm from the retreat position to the work position when the other arm slightly moves from the retreat position to the work position and then, move the other arm to the retreat position. Resultingly, the commodity located at the end of the commodity string loses the support by the other arm and moves toward one arm, other commodities of the commodity string also move toward one arm, the commodity at the end of the commodity string is held by one arm present at the work position, and resultingly every commodity of the commodity string is held by one arm present at the work position.

Moreover, according to another aspect of the present invention, it is possible to obtain a commodity takeout unit of an automatic vending machine provided with a boxy case in which a first aperture is formed at one end of its apex and a second aperture is formed at the other end of its apex; a first arm set in the case, supported by the case so as to be rotatable about the axis line passing through the proximal portion, and movable between the work position passing through the first aperture and standing above the case and the retreat position falling into the case; an intermediate arm set in the case, supported by the case so as to be reciprocatively linearly movable between a first position close to the first aperture and a second position close to the second aperture, and engaging with the proximal portion of the first arm over a predetermined moving range including the first position nearby the first position to control the rotation of the firs arm and hold the first arm at the work position; a second arm set in the case, connected to the intermediate arm so as to be rotatable about the axis line passing through the proximal portion, guided by the side wall of the case, present at the retreat position falling into the case when the intermediate arm is present at the first position, and present at the work position passing through the second aperture and standing above the case; and a spring for urging the intermediate arm toward the first position.

In the case of the commodity takeout unit of an automatic vending machine, when the intermediate arm moves from the first position to the second position, the engagement between the intermediate arm and the proximal portion of the first arm is maintained until the intermediate arm reaches a predetermined position and the first arm is held at the work position. Resultingly, until the intermediate arm reaches the predetermined position, the commodity at an end of a commodity string is held by the first arm. The second arm connected to the intermediate arm moves from the retreat position toward the work position synchronously with the movement of the intermediate arm. Therefore, when the intermediate arm reaches the predetermined position, the second arm moves up to the vicinity of the work position. Resultingly, when the intermediate arm reaches the predetermined position, a commodity adjacent to the commodity at the end of the commodity string is held by the second arm.

When the intermediate arm further moves toward the second position, the engagement between the intermediate arm and the proximal portion of the first arm is released and the first arm rotated due to the weight of the commodity at the end of the commodity string and moves to the retreat position. Thus, the commodity at the end of the commodity string loses the support by the first arm and drops from a commodity rack or commodity route due to the weight of its own. The second arm reaches the work position and further securely holds the already-held commodity adjacent to the commodity at the end of the commodity string. As a result, only the commodity at the end of the commodity string is securely taken out of the commodity rack or commodity route.

After the commodity is taken out, when the intermediate arm moves up to the predetermined position while it moves from the second position to the first position, the intermediate arm engages with the proximal portion of the first arm and the first arm present at the retreat position moves to the work position and it is held at the work position. The second arm connected to the intermediate arm moves from the work position toward the retreat position synchronously with the movement of the intermediate arm. However, the second arm is still present at the vicinity of the work position when the intermediate arm moves up to the predetermined position. Therefore, when the intermediate arm reaches the predetermined position, the commodity adjacent to the commodity at the end of the commodity string already dropped from the commodity rack or commodity route is still held by the second arm. When the intermediate arm further moves toward the first position, the second arm moves to the retreat position, the commodity held by the second arm, that is, the commodity located at the end of the commodity string loses the support by the second arm and moves toward the first arm, and the other commodities of the commodity string also move toward the first arm. The commodity at end of the commodity string is held by the fist arm held at the work position and moreover, every commodity of the commodity string is held by the first arm.

BEST MODE FOR CARRYING OUT THE INVENTION

In the following description referring to the accompanying drawings, arrows I, II, III, IV, V, and VI in FIGS. 1 to 4 denote the front, rear, leftward, rightward, upward, and downward respectively.

The commodity takeout unit of an automatic vending machine of an embodiment of the present invention is described below by referring to FIGS. 1 to 3. First, in FIGS. 1 and 2, a commodity rack 1 is set in an automatic vending machine, which tilts downward from the rear toward the front. Though only one commodity rack 1 is shown, a plurality of commodity racks are arranged vertically separately from each other. A plurality of prismatic commodities 2 respectively finished by cramming contents in a vessel such as bottle, can, or PET bottle are mounted on the commodity rack 1 in line in the transverse direction while extending their central axes in the longitudinal direction. The commodities 2 are arranged so as to form a plurality of strings separately from each other rightward and leftward on each commodity rack 1. Each string of commodities is hereafter referred to as commodity string. Commodity strings are partitioned by a guide plate la. A commodity takeout unit 3 is set at the bottom margin of the commodity rack 1, that is, at the lower side of the front end of the commodity rack 1 immediately below a commodity string.

Figure 3:
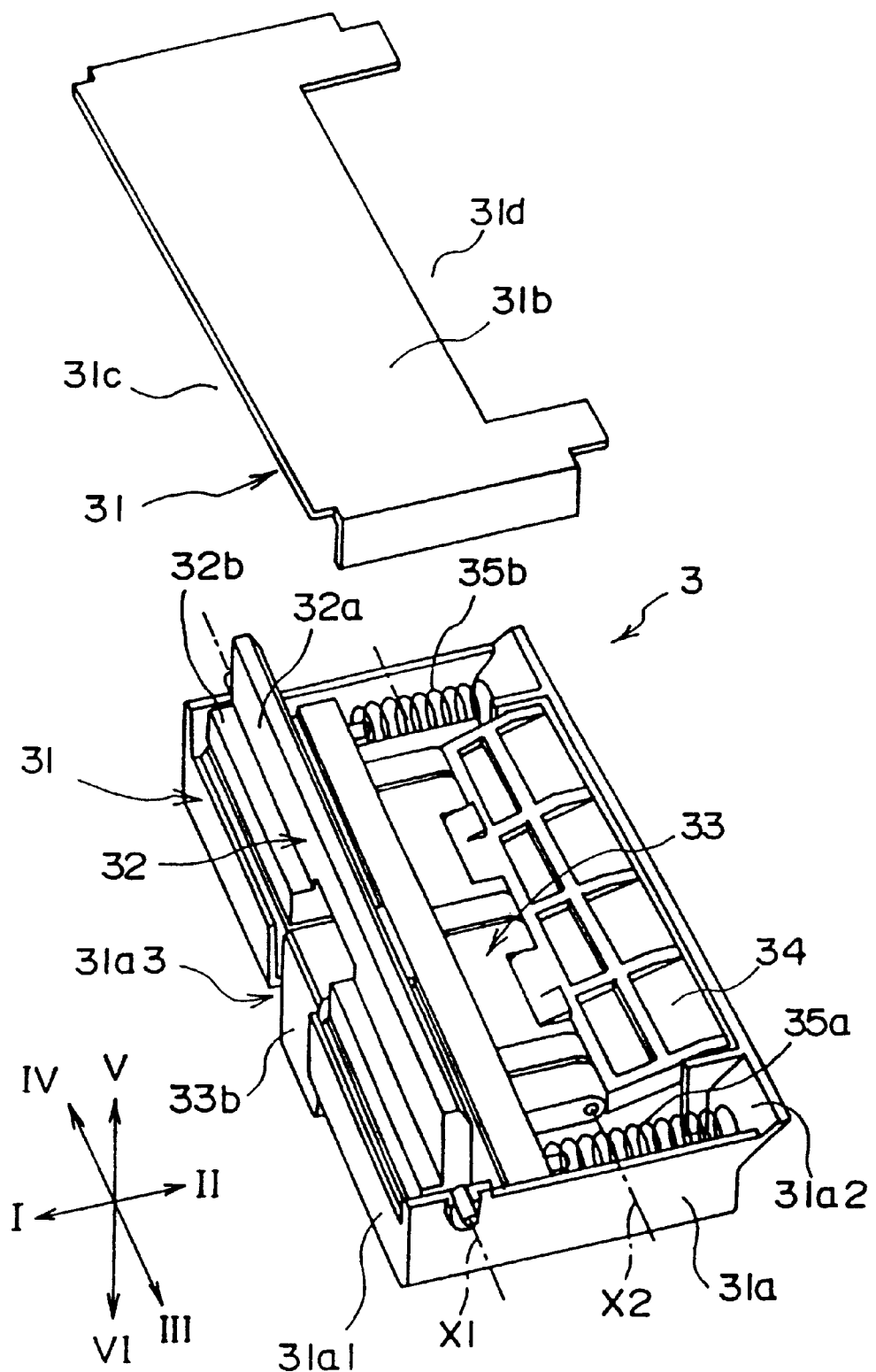
FIG. 3 is an enlarged exploded perspective view of the commodity takeout unit in FIG. 1.

In FIG. 3, the commodity takeout unit 3 is provided with a boxy case 31. The case 31 includes a shallow housing 31a whose upper end is opened and a lid 31b set to the housing 31a and covering the central portion at the opened upper end of the housing 31a. The front side wall 31a1 of the housing 31a is constituted with only the lower half portion. The upper half portion of the rear side wall 31a2 of the housing 31a tilts backward. A notch 31a3 is formed at the transverse-directional center of the front side wall 31a1 of the case 31 and at the transverse-directional center of the front half portion of the bottom wall of the case 31a. A first aperture 31c is formed with the side wall and the lid 31b of the housing 31a at the front end of the apex of the case 31 and a second aperture 31d is formed at the rear end of the apex. The case 31 is secured to the bottom of the front end of the commodity rack 1. An aperture (not illustrated) is formed at a position facing the first aperture 31c and second aperture 31d of the case 31.

A first arm 32 having an L-shaped cross section is set in the case 31. The first arm 32 is supported by the case 31 about an axis line X1 passing through the proximal portion which is the intersectional portion between a long leg 32a and a short leg 32b and extending in the transverse direction. The first arm 32 rotates between the work position (see FIGS. 1 and 3) passing through the first aperture 31c and an aperture of the commodity rack 1 facing the aperture 31c and standing above the commodity rack 1 and the retreat position (see FIG. 2) falling into the case 31. As shown in FIG. 2, when the first arm 32 is present at the retreat position, the long leg 32a contacts the front side wall 31a1 of the housing 31a and the first arm 32 is held at the retreat position.

An intermediate arm 33 is set in the case 31. The intermediate arm 33 is guided by the case 31 so as to be longitudinally reciprocatively linearly movable between a front first position close to the first aperture 31c shown in FIGS. 1 and 3 and a rear second position close to the second aperture 31d shown in FIG. 2. A stepped portion 33a is formed at the front end of the intermediate arm 33 over a predetermined length. While the intermediate arm 33 is present in a predetermined moving range including the first position nearby the first position, more minutely, until the front end of the intermediate arm 33 reaches a position nearby the position immediately below the axis line X1, the stepped portion 33a engages with the proximal portion and the short leg 32b of the first arm 32, controls the rotation of the first arm 32, and holds the first arm at the work position. When the intermediate arm 33 exceeds the predetermined moving range and moves toward the second position, the engagement between the stepped portion 33a and the proximal portion and short leg 32b of the first arm 32 is slowly released and the rotation control of the first arm 32 is slowly released. When the intermediate arm 33 further moves toward the second position, the engagement between the stepped portion 33a and the proximal portion and short leg 32b of the first arm 32 is completely released and the first arm 32 becomes rotatable. A pushing piece portion 33b is formed at the transverse-directional center of the front end of the intermediate arm 33. The pushing-piece portion protrudes to the lower side of the housing 31a by passing through the notch 31a3 formed on the housing 31a.

A second arm 34 is set in the case 31. The second arm 34 is connected to the rear of the intermediate arm 33 so as to be rotatable about an axis line X2 passing through the proximal portion serving as the front end and transversely extending. The second arm 34 is present at the retreat position falling into the case 31 when the intermediate arm 33 is present at the first position as shown in FIGS. 1 and 3 and present at the work position passing through the second aperture 31d and the aperture formed on the commodity rack 1 by facing the second aperture 31d and standing above the commodity rack 1 when the intermediate arm 33 is present at the second position as shown in FIG. 2. The second arm 34 always contacts the backward-tilted upper half portion of the rear side wall 31a2 of the housing 31 and moves by being guided by the upper half portion.

As shown in FIG. 3, a pair of springs 35a and 35b for urging the intermediate arm 33 toward the first position are arranged at the right end and left end in the case 31 one each. The case 31, first arm 32, intermediate arm 33, and second arm 34 are made of resin.

Operations of the above commodity takeout unit of an automatic vending machine are described below.

Figure 1:
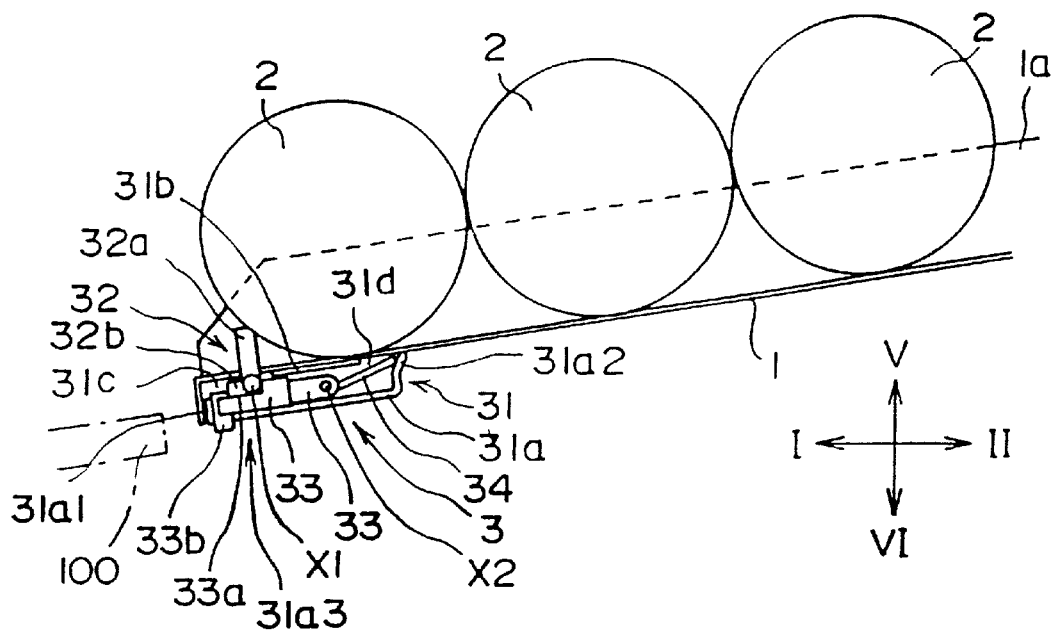
FIG. 1 is a side view of the commodity takeout unit of an automatic vending machine of the first embodiment of the present invention under a takeout standby state.

Under the takeout standby state shown in FIG. 1, the intermediate arm 33 is present at the first position by being urged by the springs 35a and 35b and it is held at the work position standing above the commodity rack 1, and the second arm is present at the retreat position falling into the case 31. As a result, the commodity 2 at the front end of a commodity string engages with the first arm 32 and thereby, every commodity of the commodity string is held by the first arm 32 on the commodity rack 1.

A driving rod 100 driven by a not-illustrated driving source enters from the front end of the commodity rack 1 along the bottom of the commodity rack 1. The front end of the driving rod 100 contacts the pushing piece portion 33b of the intermediate arm 33 to push the pushing-piece portion 33b and moreover, the intermediate arm 33. Resultingly, the intermediate arm 33 moves from the first position shown in FIG. 1 toward the second position shown in FIG. 2.

When the intermediate arm 33 moves from the first position to the second position, the engagement between the intermediate arm 33 and the proximal portion and short leg 32b of the first arm 32 is maintained until the intermediate arm 33 reaches a predetermined position, more minutely, until the front end of the intermediate arm 33 reaches a position nearby the position immediately below the axis line X1 and the first arm 32 is held at the work position shown in FIG. 1. Thus, the commodity 2 at the front end of the commodity string is securely held by the first arm 32 until the intermediate arm 33 reaches the predetermined position. The second arm 34 connected to moves from the retreat position shown in FIG. 1 toward the work position shown in FIG. 2 synchronously with the movement of the intermediate arm 33. Therefore, when the intermediate arm 32 reaches the predetermined position, the second arm 34 moves up to the vicinity of the work position shown in FIG. 2. Thus, when the intermediate arm 33 reaches the predetermined position, the commodity 2 at the second position from the front end of the commodity string is held by the second arm 34.

When the intermediate arm 33 further moves toward the second position, the engagement between the intermediate arm 33 and the proximal portion and short leg 32b of the first arm 32 is released, and the first arm 32 is rotated due to the weight of the commodity 2 at the front end of the commodity string and moves to the retreat position falling into the case 31. As a result, the commodity 2 at the front end of the commodity string loses the support by the first arm and drops from the front end of the commodity rack 1. The second arm 34 reaches the work position to further securely hold the already-held commodity 2 at the second position from the front end of the commodity string. Thus, only the commodity 2 at the front end of the commodity string is taken out of the commodity rack 1.

Figure 2:
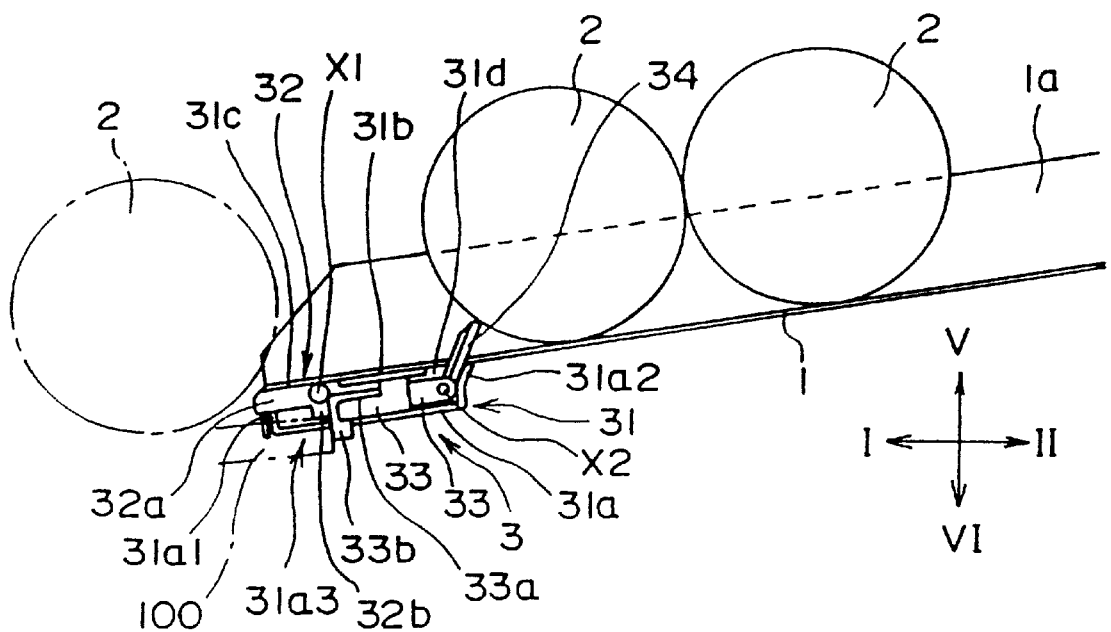
FIG. 2 is a side view of the commodity takeout unit in FIG. 1 under a takeout execution state.

After taking out the commodity, the driving rod 100 retreats from the gap between the commodity racks 1 and the intermediate arm 33 returns to the first position shown in FIG. 1 from the second position shown in FIG. 2 by being urged by the springs 35a and 35b.

When the intermediate arm 33 moves up to the predetermined position while the intermediate arm 33 moves from the second position to the first position, the intermediate arm 33 engages with the proximal portion and short leg 32b of the first arm 32, and the first arm 32 present at the retreat position shown in FIG. 2 moves to the work position shown in FIG. 1 and it is held at the work position. The second arm 34 connected to the intermediate arm moves from the work position shown in FIG. 2 toward the retreat position shown in FIG. 1 synchronously with the movement of the intermediate arm 33. However, the intermediate arm 33 moves up to the predetermined position, the second arm 34 is still present nearby the work position. Therefore, when the intermediate arm 33 reaches the predetermined position, the commodity 2 at the second position from the front end of the commodity string is still held by the second arm 34. When the intermediate arm 33 further moves toward the first position, the second arm 34 moves to the retreat position, the commodity 2 held by the second arm 34, that is, the commodity 2 located at the front end of the commodity string loses the support by the second arm 34 and moves toward the first arm 32, and other commodities 2 of the commodity string also move toward the first arm 32. The commodity 2 at the front end of the commodity string is held by the first arm 32 held at the work position and moreover, every commodity 2 of the commodity string is held by the first arm 32.

As described above, because the commodity takeout unit 3 drives the first arm 32 and the second arm 34 with a time difference, it is possible to securely take out only the commodity 2 at the front end of a commodity string.

Because the case 31, first arm 32, intermediate arm 33, and second arm 34 are made of resin, the commodity takeout unit 3 is lightweight and it is possible to easily set the commodity takeout unit 3 in an automatic vending machine. Moreover, because main parts are made of resin, the manufacturing cost of the commodity takeout unit 3 is low. Because the first arm 32, intermediate arm 33, second arm 34, and springs 35a and 35b are stored in the case 31, it is easy to set the commodity takeout unit 3 to the commodity rack 2.

Figure 4:
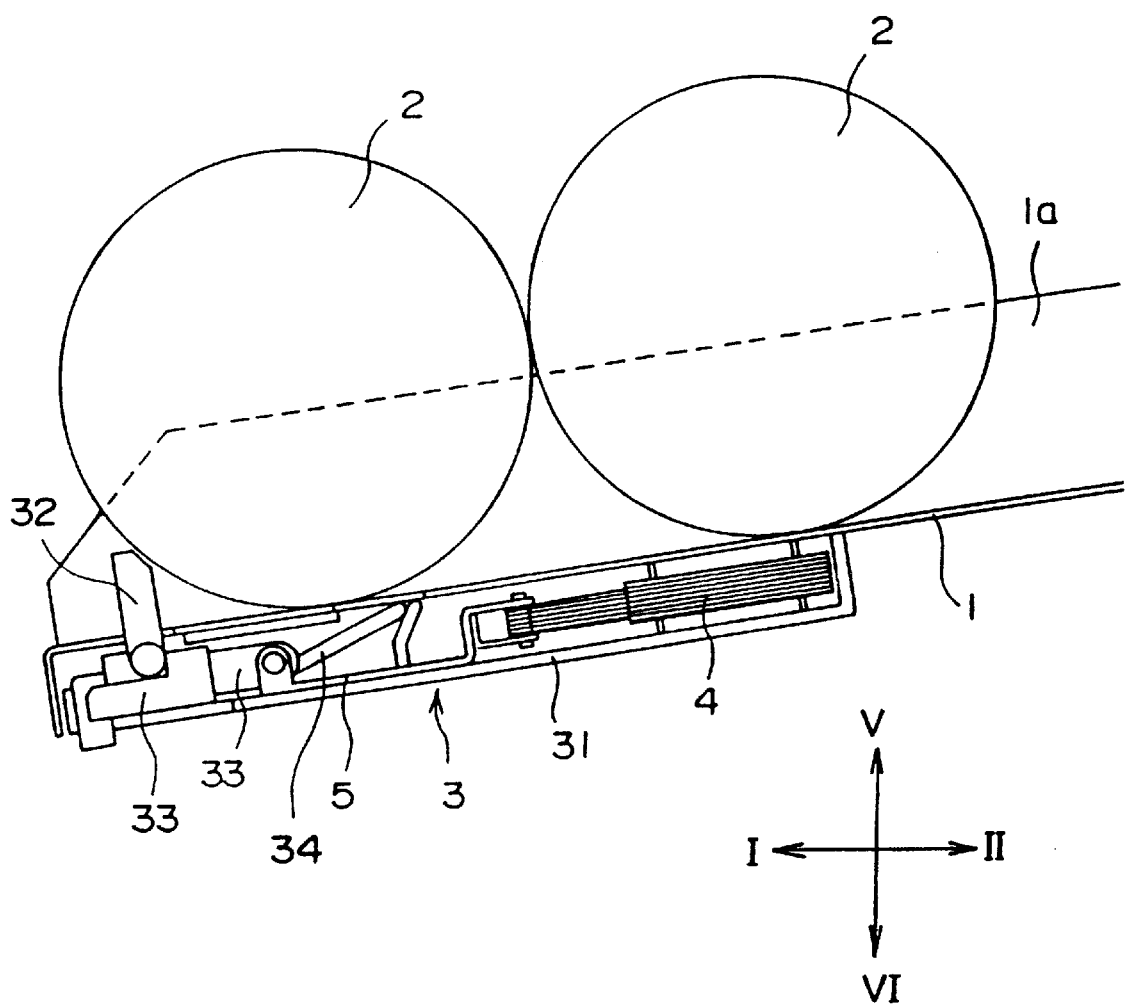
FIG. 4 is a side view of the commodity takeout unit of an automatic vending machine of another embodiment of the present invention.

Then, a commodity takeout mechanism of another embodiment of the present invention is described below by referring to FIG. 4. The commodity takeout mechanism includes an electromagnetic solenoid 4 set in the case 31. The electromagnetic solenoid 4 is connected to the intermediate arm 33 by a connection member 5. Thus, by exciting the electromagnetic solenoid 4, the intermediate arm 33 is driven.

According to the commodity takeout mechanism, operations of a commodity takeout unit are more securely performed because the intermediate arm 33 is driven by the electromagnetic solenoid 4.

In the above description, an automatic vending machine provided with a tilted commodity rack is taken as an example. However, the same is true for an automatic vending machine provided with a serpentine commodity rack.

What is claimed is:

1. A commodity takeout unit of an automatic vending machine provided with a pair of arms movable between the work position protruding to a commodity route and the retreat position retreating from said commodity route and an intermediate arm between said pair of arms that cooperates with said pair of arms to drive said pair of arms with a time difference.

2. A commodity takeout unit of an automatic vending machine comprising a boxy case in which a first aperture is formed at one end of the apex and a second aperture is formed at the other end of the apex; a first arm set in said case, supported by said case so as to be rotatable about an axis line passing through a proximal portion, and movable between the work position passing though said first aperture and standing above said case and the retreat position falling into said case; an intermediate arm set in said case, supported by said case so as to be reciprocatively linearly rotatable between a first position close to said first aperture and a second position closed to said second aperture, and engaging with the proximal portion of said first arm over a predetermined moving range including said first position nearby said first position to control the rotation of said first arm and hold said first arm at said work position; a second arm set in said case, connected to said intermediate arm so as to be rotatable about an axis line passing through a proximal portion, guided by the side wall of said case, present at the retreat position falling into said case when said intermediate arm is present at said first position and present at said work position passing through said second aperture and standing above said case when said intermediate arm is present at said second position; and a spring for urging said intermediate arm toward said first position.

3. The commodity takeout unit of an automatic vending machine according to claim 2, wherein said first arm, said second arm, said intermediate arm, and said case are made of resin.

4. The commodity takeout unit of an automatic vending machine according to claim 2 or 3, wherein an electromagnetic solenoid for driving said intermediate arm is included.

* * * * *